United States Patent
Saboune et al.

(10) Patent No.: US 9,983,678 B1
(45) Date of Patent: May 29, 2018

(54) USER INTERFACE DEVICE CONFIGURED TO SELECTIVELY HIDE COMPONENTS FROM TACTILE PERCEPTION

(71) Applicant: Immersion Corporation, San Jose, CA (US)

(72) Inventors: Jamal Saboune, Montreal (CA); Juan Manuel Cruz-Hernandez, Montreal (CA); Vahid Khoshkava, Montreal (CA)

(73) Assignee: Immersion Corporation, San Jose, CA (US)

(*) Notice: Subject to any disclaimer, the term of this patent is extended or adjusted under 35 U.S.C. 154(b) by 0 days. days.

(21) Appl. No.: 15/583,088

(22) Filed: May 1, 2017

(51) Int. Cl.
*G09G 5/00* (2006.01)
*G06F 3/01* (2006.01)
*G06F 3/02* (2006.01)
*A63F 13/285* (2014.01)

(52) U.S. Cl.
CPC ............ *G06F 3/016* (2013.01); *A63F 13/285* (2014.09); *G06F 3/0202* (2013.01)

(58) Field of Classification Search
CPC ....... G06F 3/016; G06F 3/0202; A63F 13/285
USPC ......................................... 345/169
See application file for complete search history.

(56) References Cited

U.S. PATENT DOCUMENTS

| 2006/0192465 | A1* | 8/2006 | Kornbluh | B64C 3/48 310/309 |
| 2010/0035665 | A1* | 2/2010 | Munson | G06F 1/1624 455/575.1 |
| 2011/0234498 | A1* | 9/2011 | Gray | G06F 3/016 345/168 |
| 2011/0304550 | A1* | 12/2011 | Romera Jolliff | G06F 3/016 345/168 |
| 2016/0167306 | A1* | 6/2016 | Vidimce | B29C 67/0088 264/40.1 |

OTHER PUBLICATIONS

Ion (Alexandra Ion, "Editing Metamaterials, Creating Mechanisms", Proceedings of the 9th Ph.D. retreat of the HPI Research School on service-oriented systems engineering, pp. 97-111, Universitätsverlag Potsdam, Mar. 23, 2017, retrieved from web on Jul. 8, 2017).*

(Continued)

*Primary Examiner* — Kent Chang
*Assistant Examiner* — Mark Edwards
(74) *Attorney, Agent, or Firm* — Medler Ferro Woodhouse & Mills PLLC (57) ABSTRACT

A user interface device having a user input component, a mechanical metamaterial region, one or more actuators, and a control unit is presented. The mechanical metamaterial region is located over the user input component. The one or more actuators are coupled to the mechanical metamaterial region, which has an internal structure that is mechanically alterable with the one or more actuators, and has a mechanical property that changes in response to the alteration of the internal structure by the one or more actuators. The control unit is in communication with the one or more actuators, and is configured to determine whether the user input component is to be hidden from tactile perception, and to activate the one or more actuators to mechanically alter the internal structure of the mechanical metamaterial region.

24 Claims, 8 Drawing Sheets

(56) References Cited

OTHER PUBLICATIONS

Florijn (Bastiaan Florijn et al., "Programmable Mechanical Metamaterials", Physical Review Letters 113, 175503, published Oct. 24, 2014, pp. 175503-1-175503-5, DOI:https://doi.org/10.1103/PhysRevLett.113.175503, retrieved from web on Jul. 9, 2017).*

"New Material Hides Objects from Sense of Touch," The Skeptics' Guide to the Universe. http://www.theskepticsguide.org/newmaterialhidesobjectsfromsenseoftouch.

"Scientists move one step closer to creating an invisibility cloak," Physics/General Physics, https://phys.org/print387777568.html (Jul. 15, 2016).

Buckmann, T. et al., "An elasto-mechanical unfeelability cloak made of pentamode metamaterials," Nature Communications, 5:4130, pp. 1-6.

Carter, Tom et al., "UltraHaptics: Multi-Point Mid-Air Haptic Feedback for Touch Surfaces," *UIST 2013*, Oct. 8-11, 2013, St Andrews, United Kingdom. http://dx.doi.org/10.1145/2501988.2502018.

Florijn, Bastiaan et al., "Programmable Mechanical Metamaterials," Huygens-Kamerling Onnes Lab, Universiteit Leiden, Postbus 9504, 2300 RA Leiden, The Netherlands dated Jul. 18, 2014.

Ma, Yungui et al., "Experimental demonstration of a multiphysics cloak: manipulating heat flux and electric current simultaneously", State Key Lab of Modern Optical Instrumentation, Centre for Optical and Electromagnetic Research, Department of Optical Engineering, Zhejiang University, Hangzhou 310058, China.

Ni, Xingjie et al., "An ultrathin invisibility skin cloak for visible light," Applied Optics, vol. 349, issue 6254, Sep. 18, 2015. http://science.sciencemag.org/.

Zigoneanu, Lucian et al., "Three-Dimensional Broadband Omnidirectional Acoustic Ground Cloak," Phys. Rev. Lett. 106, 253901 (2011), pp. 1-5.

* cited by examiner

USER INTERFACE DEVICE CONFIGURED TO SELECTIVELY HIDE COMPONENTS FROM TACTILE PERCEPTION

FIELD OF THE INVENTION

The present invention is directed to a user interface device configured to selectively hide components from tactile perception, and has application in user interfaces, gaming, automotive interfaces, wearable devices, and consumer electronics.

BACKGROUND

Humans interface with electronic devices in a variety of applications, and the need for a more natural, easy-to-use, and informative interface device is a constant concern. Some applications involve interacting with a user interface device, such as a personal computer, portable computer, mobile phone, and home video game console controller. Users can interact with a computing environment by inputting commands or data from the user interface device. A computer system within or in communication with the user interface device can update a computing environment in response to the user's interaction with the user interface device. Visual feedback may be provided to display updates to the computing environment. Some user interface devices may include a physical user input component, such as a physical button or a physical keyboard. In some user interface devices, haptic feedback (e.g., tactile feedback or kinesthetic feedback) is provided to a user. The haptic feedback (or, more generally, haptic effect) may be combined with visual and auditory feedback as the user interface device is being used.

SUMMARY

One aspect of the embodiments herein relate to a user interface device (e.g., a mobile phone) comprising a user input component, a mechanical metamaterial region located over the user input component, and one or more actuators coupled to the mechanical metamaterial region. The mechanical metamaterial region has an internal structure that is alterable by the one or more actuators, and has a mechanical property that changes in response to the alteration of the internal structure by the one or more actuators. The user interface device further comprises a control unit in communication with the one or more actuators. The control unit is configured to determine whether the user input component is to be hidden from tactile perception, and is configured to activate the one or more actuators to alter the internal structure of the mechanical metamaterial region in response to the determination that the user input component is to be hidden from tactile perception.

In an embodiment, the one or more actuators are configured to stretch or compress the mechanical metamaterial region. The mechanical property of the mechanical metamaterial region changes in response to the mechanical metamaterial region being stretched or compressed.

In an embodiment, the mechanical metamaterial region comprises a rectangular layer of mechanical metamaterial. The one or more actuators are configured to stretch or compress the mechanical metamaterial region along a length or width of the rectangular layer of mechanical metamaterial.

In an embodiment, the control unit is further configured to determine whether a haptic effect on the user interface device is to be hidden from tactile perception, and to activate the one or more actuators in response to determining that the haptic effect is to be hidden on the user interface device.

In an embodiment, the determination of whether the user input component is to be hidden from tactile perception is based on an identity of an application that is running on the user interface device.

In an embodiment, the user input component is a keyboard. The control unit is configured to determine that tactile perception of the user input component is to be enabled or to remain enabled in response to a determination that the application running on the user interface device is a text messaging application or a text editing application.

In an embodiment, the control unit is configured to determine that the user input component is to be hidden from tactile perception in response to a determination that the application running on the user interface device is a video viewing application.

In an embodiment, the mechanical metamaterial region is at least first and second mechanical metamaterial regions that are isolated from each other, so that a mechanical property of the first mechanical metamaterial region can be changed without changing a mechanical property of the second mechanical metamaterial region.

In an embodiment, the user input component is a button and is one of a plurality of buttons on the user interface device. Each of the first and second mechanical metamaterial regions covers a different button of the plurality of buttons.

In an embodiment, the control unit is configured to cause an internal structure of one of the at least first and second mechanical metamaterial regions to change in response to determining that all buttons covered by the one of the at least first and second mechanical metamaterial regions currently has no functionality in an application being executed on the user interface device.

In an embodiment, the user input component is a physical user input component.

In an embodiment, the user interface device does not include a pump layer or a fluid layer.

In an embodiment, the internal structure of the mechanical metamaterial region has a lattice structure that can be altered by the one or more actuators.

In an embodiment, the internal structure of the mechanical metamaterial region has an array of holes, wherein a respective hole of the array of holes has a diameter in a range between 7 mm and 10 mm and has a shape that can be altered by the one or more actuators.

In an embodiment, the mechanical property that changes in response to the alteration of the internal structure is at least one of a shear modulus and a bulk modulus of the mechanical metamaterial region.

In an embodiment, the mechanical metamaterial region is made of a pentamode metamaterial.

In an embodiment, the user interface device is a mobile phone, wherein the user interface device further comprises a display device, and the user input component is a keyboard adjacent to the display device.

In an embodiment, the user interface device is a game console controller in communication with a host computer, and the user input component is a button.

Embodiments hereof relate to a user interface device comprising a component having a first surface, a mechanical metamaterial region located over the first surface, and an activation device coupled to the mechanical metamaterial region. The mechanical metamaterial region has an internal structure that is alterable by the activation device, and has a mechanical property that changes in response to the alteration of the internal structure by the activation device.

In an embodiment, the component is a user input component, and the activation device comprises one or more actuators, and the user interface device further has a control unit in communication with the one or more actuators. The control unit is configured to determine whether the first surface is to be hidden from tactile perception, and to activate the one or more actuators to alter the internal structure of the mechanical metamaterial region in response to the determination that the first surface is to be hidden from tactile perception.

In an embodiment, the activation device is a manually actuatable component coupled to the mechanical metamaterial region, and is configured, when manually actuated, to alter the internal structure of the mechanical metamaterial region.

In an embodiment, the manually actuatable device is a lever arm directly coupled to the mechanical metamaterial region, or is a knob that is coupled to the mechanical metamaterial region via a cord.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments hereof relate to a user interface device (e.g., a mobile phone or game console controller) which uses a region of metamaterial to hide components (e.g., user interface components) on the device. For example, a user input component such as a keyboard or home button may be hidden from tactile perception by a mechanical metamaterial, and/or hidden from visual perception by an optical metamaterial. For instance, the keyboard or home button may be hidden when it is not in use. A control unit of the user interface device may determine whether a user input component is to be hidden from perception, and may activate, with one or more actuators, a region of metamaterial to hide the user input component from tactile or visual perception. The metamaterial may further be able to be deactivated to a state in which the user input component is tactilely or visually perceivable again. More generally speaking, the metamaterial may be used to hide from tactile perception any component having a surface that provides a mechanical feature (e.g., a surface having a bump or ridge).

In an embodiment, the metamaterial may, generally speaking, be a material having a property that is much more influenced by its internal structure than by its composition. Metamaterials include an optical metamaterial (also referred to as a photonic metamaterial) and a mechanical metamaterial. The mechanical metamaterial of the embodiments hereof may be a layer of material disposed over a user input component to cover the user input component. The internal structure of the mechanical metamaterial may cause the metamaterial to exhibit a mechanical cloaking property in which the mechanical metamaterial is able to hide the user input component from tactile perception. In some instances, the mechanical metamaterial may be transparent, while in other instances it may be opaque. In an embodiment, the internal structure of the mechanical metamaterial may be mechanically alterable with one or more actuators (or with any other type of activation device), and its mechanical property may change in response to the mechanical alteration of its internal structure. By altering the internal structure of the mechanical metamaterial, the mechanical metamaterial may be switched between an activated state and a deactivated state. In the activated state, the mechanical metamaterial may be configured to hide an underlying object from tactile perception. The mechanical metamaterial may be able to be switched back to the deactivated state, in which the mechanical metamaterial may allow the underlying object to be tactilely perceived again. More generally speaking, the internal structure of the mechanical metamaterial may be alterable with an activation device, which may comprise the one or more actuators, comprise a heating device, a manually actuatable component, any other activation device, or any combination thereof. The one or more actuators may include, e.g., a piezoelectric element coupled to the mechanical metamaterial. The manually actuated component may include, e.g., a lever arm or knob that is directly or indirectly coupled to the mechanical metamaterial. The lever arm may, e.g., be manually actuated by a user in order to pull or push on the mechanical metamaterial so as to alter an internal structure thereof. Pulling or pushing the lever arm in one direction may switch the mechanical metamaterial from a deactivated state to an activated state, while pulling or pushing the lever arm in a second and opposite direction may switch the mechanical metamaterial from the activated state to the deactivated state. In another example, the knob may be attached to a cord that is directly coupled to the mechanical metamaterial. The knob can be manually actuated back and forth to pull on the cord, which may alter the internal structure of the mechanical metamaterial.

In an embodiment, the mechanical metamaterial in an activated state may exhibit a mechanical property that remains substantially the same regardless of whether the mechanical metamaterial is covering (e.g., completely on top of, partially encapsulating, or completely encapsulating) another object. Examples of this mechanical property include compressibility (e.g., a bulk modulus) and/or a shear property (e.g., shear modulus). In some cases, tactile perception of a user input component beneath a layer of non-rigid material may be based on sensing changes that the user input component causes to the mechanical property of the layer of non-rigid material. For instance, the presence of a user input component under a layer of non-rigid material may decrease the compressibility of the layer and/or change a shear property of the layer. A user may tactilely sense this change to infer that an object is underneath (e.g., completely underneath, partially encapsulated by, or completely encapsulated by) the layer of covering material. A layer of mechanical metamaterial switched to the activated state, however, may have a mechanical property, such as bulk modulus or shear modulus, that remains substantially the same regardless of whether a user input component is placed underneath the layer of mechanical metamaterial. Thus, when a user touches the layer of mechanical metamaterial, the user may perceive that there is no user input component beneath the layer of mechanical metamaterial, even if there is in fact an object underneath the layer. Thus, this feature of the mechanical metamaterial provides the material with a mechanical cloaking property that hides the user input component from tactile perception. Mechanical metamaterials are further discussed in more detail later in the disclosure.

In an embodiment, one or more regions of mechanical metamaterial may replace use of a fluid layer or pump layer for creating a temporary keyboard or other user input component. Such a fluid layer or pump layer may be configured to have a surface inflate to create deformations that form keys of a keyboard or other user input component. Such a keyboard may be temporary in that the fluid or pump layer can be deflated to remove the surface deformations. Since a mechanical metamaterial may be able to hide keys of a keyboard from tactile perception, use of a mechanical metamaterial in accordance herewith allows a user interface device to incorporate a more permanent keyboard or other user input component, eliminating a need to use a fluid layer or pump layer to create a temporary user input component. Alternatively, in an embodiment, a mechanical metamaterial in accordance herewith may be used in combination with such a fluid layer or pump layer.

In an embodiment, the user interface device may have a control unit which determines whether a user input component is to be hidden from tactile perception. This determination may be based on, e.g., which application is running on the user interface device. As discussed in more detail below, information about what application is running (i.e., an identity of an application running) on the user interface device may be used to determine whether the user input component (e.g., keyboard) is being used. In one example, a mechanical cloaking may be applied to a mobile phone equipped with a physical keyboard (e.g., a mechanical keyboard) that is covered with a region of mechanical metamaterial. This region may also be referred to as a mechanical metamaterial region. When a text messaging application is running on the user interface device, this may indicate that the keyboard is in use. In that situation, the control unit may deactivate the mechanical metamaterial region, or keep the mechanical metamaterial region in a deactivated state, so that the keyboard can be tactilely perceived by the user. On the other hand, when a video viewing application is running on the user interface device, this may indicate that the keyboard is not in use. In that situation, the control unit may activate the mechanical metamaterial region, or keep the mechanical metamaterial region in an activated state, to mechanically cloak or hide the keyboard from tactile perception.

In another example, the user interface device may be a game console controller having a plurality of buttons that are covered by separate regions of mechanical metamaterial. The game console controller may have a control unit that applies mechanical cloaking to buttons that have no function at a present time in the game. The mechanical cloaking for a button may be performed by activating a mechanical metamaterial region covering that button, so that the user is less likely to press that button. Selected other buttons on the game console controller may be covered by their own respective mechanical metamaterial regions, but those mechanical metamaterial regions may be in a deactivated state so that a user can still tactilely perceive those other buttons.

In an embodiment, the user interface device may use the mechanical metamaterial to hide a haptic effect (e.g., a deformation haptic effect) provided by a haptic actuator of the device from tactile perception, as discussed in more detail below.

Figure 1A:
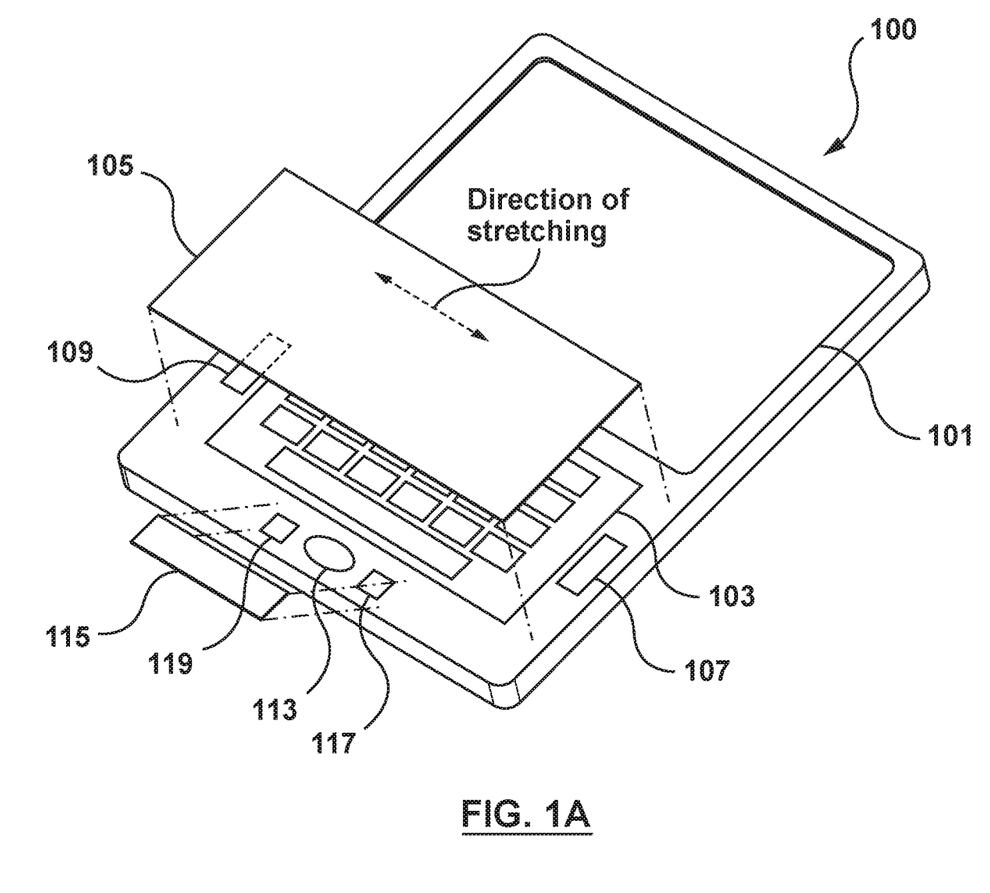
FIG. 1A is a perspective view of a user interface device having a plurality of mechanical metamaterial regions, according to an embodiment herein.

FIG. 1A illustrates an example user interface device 100 (e.g., a mobile phone, tablet computer, or laptop) that includes a display device 101, a first user input component 103 (e.g., a physical keyboard having a plurality of physical keys adjacent to the display device 101) and a second user input component 113 (e.g., a physical home button). FIG. 1A provides a partially exploded view which further shows the user interface device 100 to include a first region 105 of mechanical metamaterial (also referred to as mechanical metamaterial region 105) disposed directly over the first user input component 103 to cover the first user input component 103, and to include a second region 115 of mechanical metamaterial (also referred to as mechanical metamaterial region 115) that is disposed directly over the second user input component 113 to cover the second user input component 113. Each mechanical metamaterial region 105, 115 may be a layer of mechanical metamaterial, and the two regions 105, 115 may be co-planar. The two mechanical metamaterial regions 105, 115 may have the same type of mechanical metamaterial (examples of which are discussed below), or may have different types of mechanical metamaterials.

FIG. 1A further depicts actuators 107, 109 that may be configured to change an internal structure of mechanical metamaterial region 105, and depicts actuators 117, 119 that may be configured to change an internal structure of mechanical metamaterial region 115 (in another embodiment, the actuators 117, 119 may be replaced by another type of activation device, such as a manually actuatable component.). The actuators 107, 109, 117, 119 may be placed in a variety of locations. For example, the actuators may be placed completely underneath their respective metamaterial regions, to a left or right side of their respective metamaterial regions, or may be embedded within their respective metamaterial regions. The mechanical metamaterial region 105 may be isolated from the mechanical metamaterial region 115, so that a mechanical property of one mechanical metamaterial region can be changed without changing the mechanical property of the other mechanical metamaterial region.

In an embodiment, the mechanical metamaterial of both regions 105, 115 may be a material (e.g., an elastic material) that has an activated state in which the material has an internal structure that is able to hide an underlying object from tactile perception. Examples of the mechanical metamaterial include a pentamode metamaterial and a holey sheet.

In an embodiment, a pentamode metamaterial that covers an object (e.g., a stiff object) may visually and/or tactilely appear, or be perceived, to be a homogeneous isotropic elastic solid, so as to hide the covered object. In an embodiment, the pentamode metamaterial may provide a substantially uniform behavior on its surface with respect to compression and/or with respect to shear, so that a user touching the surface of the pentamode metamaterial does not perceive an object beneath a portion of the pentamode metamaterial. In other words, when an object is covered by a layer which is not a metamaterial layer, the object may change a shear property or compression property of the part of the layer covering the object. When a user's hand runs over the surface of the layer, for example, the user may detect such changes to the shear property or compression property at a location right above the object. As a result, the user may tactilely perceive the object being covered by the layer. The pentamode material, however, may exhibit substantially uniform shear and/or compression properties, such that the covered object is not detected by tactile perception. In an embodiment, an internal structure of the pentamode metamaterial is constructed from a lattice of face-centered cubic (fcc) unit cells that are hexagonal in shape and fabricated with direct laser writing (DLW). Pentamode metamaterials are discussed in more detail in "An elasto-mechanical unfeelability cloak made of pentamode metamaterials," by T. Buckmann et al., which is incorporated by reference herein in its entirety. In an embodiment, the internal structure of the pentamode material is changeable via an actuator. The actuator may be able to change the internal structure of the pentamode material from a first state (e.g., activated state) to a second state (e.g., a deactivated state), and may be able to reverse the change from the second state (e.g., deactivated state) back to the first state (e.g., activated state).

In an embodiment, a holey sheet may be a layer with an internal structure having an array of holes of uniform size, or an array of holes having different respective sizes. For example, a hole of the array may have a diameter that is in a range between 7 mm and 10 mm. This internal structure may be changed by one or more actuators, which may stretch or compress the holey sheet to stretch or compress the array of holes. Similar to the prior embodiments utilizing the pentamode material, one or more actuators may be able to change the internal structure of the holey sheet between a first state (e.g., an activated state) and a second state (e.g., a deactivated state). In a deactivated state, the holey sheet may be sufficiently compressible to allow a user to tactilely distinguish a portion of the holey sheet covering an object relative to other portions of the holey sheet. In an activated state, the holey sheet may exhibit a uniform level of stiffness, which may be higher than in the deactivated state, to hide the underlying object from tactile perception. Holey sheets are discussed in more detail in "Programmable Mechanical Metamaterials," by Bastiaan Florijn et al., which is incorporated by reference herein in its entirety.

In an embodiment, one or more of the actuators 107, 109, 117, and 119 may be configured to pull and/or push on mechanical metamaterial region 105 or 115, or to compress mechanical metamaterial region 105, 115. For example, actuators 107, 109 may be disposed at two opposite ends of mechanical metamaterial region 105. The two actuators 107, 109 may be configured to pull and/or push on the two respective ends of the mechanical metamaterial region 105 in two respective directions that are opposite to each other. The pulling action may stretch the mechanical metamaterial region 105, while the pushing action may compress the mechanical metamaterial region 105. If the mechanical metamaterial region 150 were a rectangular layer of mechanical metamaterial, the stretching or compression of the layer of mechanical metamaterial may be along a length or width of the rectangular layer, as shown in FIG. 1A. In an embodiment, the actuators 107, 109 may be coupled to the mechanical metamaterial region 105 via an adhesive, and the actuators 117, 119 may be coupled to the mechanical metamaterial region 115 via an adhesive. In an embodiment, actuators 107, 109, 117, 119 may be partially or completely embedded in their respective mechanical metamaterial regions 105, 115. Each of the actuators may be configured to provide actuation in only one direction (e.g., only actuation in an inward or outward direction relative to the layer, or only rotation in a clockwise or counterclockwise direction), or may be able to provide actuation in multiple directions. Examples of the actuators include stack piezoelectric actuators, solenoids, or motors.

In an embodiment, mechanical metamaterial region 105 or 115 may be placed in an activated state or deactivated state when an actuator 107, 109, 117, or 119 is activated. Returning the mechanical metamaterial region 105 or 115 may involve deactivating the actuator, or alternatively by activating the actuator in an opposite direction (e.g., reversing an actuation direction of the actuator), if the actuator is capable of doing so. For example, mechanical metamaterial region 105 may be in an activated state when the region is stretched by actuators 107, 109. The region 105 may be deactivated by deactivating the actuators 107, 109, or alternatively by causing the actuators 107, 109 to reverse actuation direction and compress the region 105, if the actuators are capable of doing so.

Figure 1B:
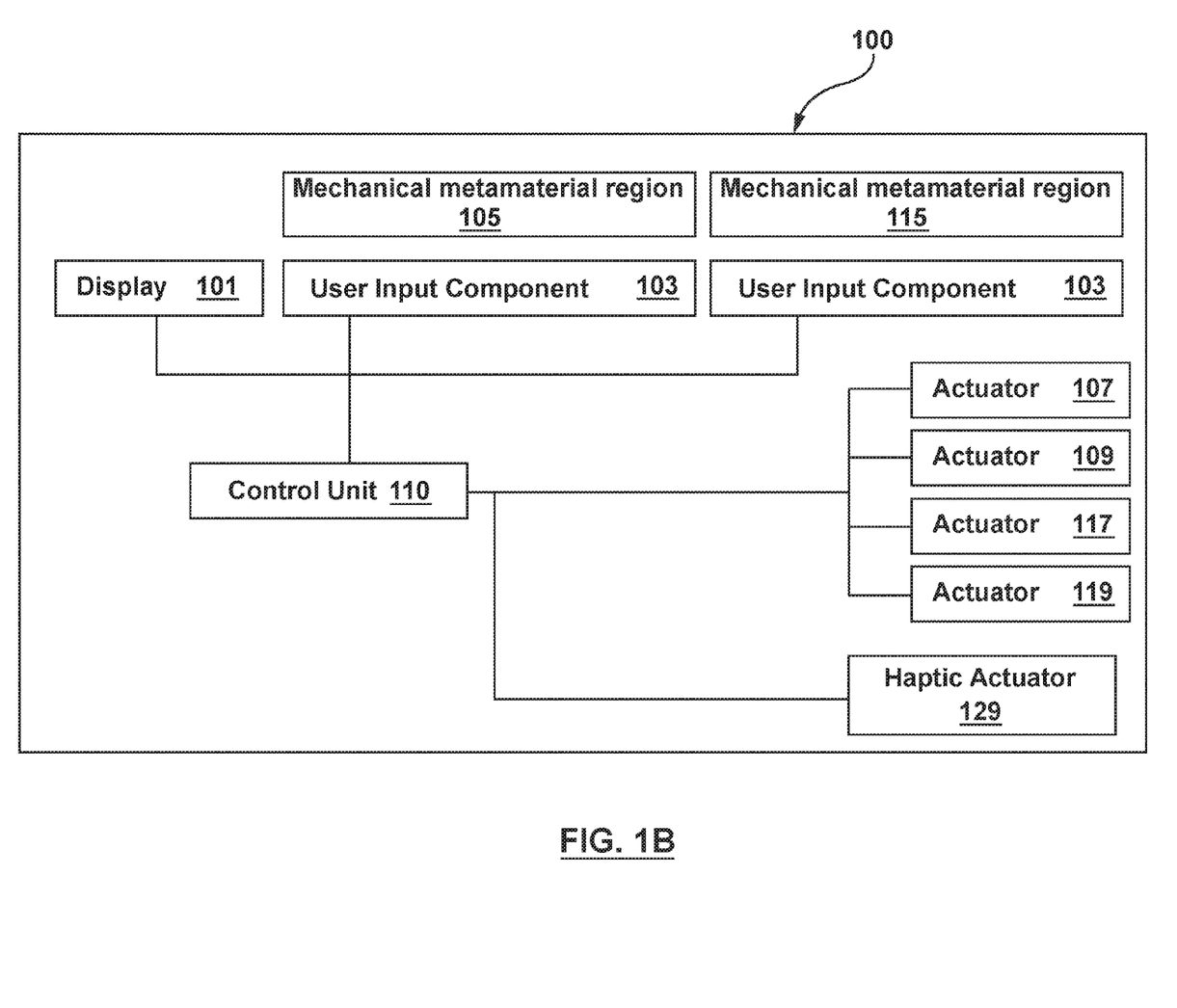
FIG. 1B is a block diagram of a user interface device having a plurality of mechanical metamaterial regions, according to an embodiment herein.

In an embodiment, the one or more actuators which may activate a metamaterial region may be controlled by a control unit 110 that is part of the user interface device 100. The control unit 110 is shown in a block diagram of the user interface device 100 in FIG. 1B. As the figure illustrates, the control unit 110 may be in communication with the display 101, the user input components 103, 113, and the actuators 107, 109, 117, 119. As described in more detail below, the control unit may determine when a user input component (e.g., 103, 113) should be hidden from tactile perception, and may activate a corresponding mechanical metamaterial region with a subset of the actuators 107, 109, 117, 119. In FIG. 1B, the user interface device 100 further includes another actuator 129 that is a haptic actuator, such as a linear resonant actuator (LRA) or eccentric rotating mass (ERM) actuator. The haptic actuator is configured to generate a haptic effect, such as a vibrotactile haptic effect. As discussed below with respect to FIG. 3A, the haptic actuator may be covered by a mechanical metamaterial region. When the mechanical metamaterial region is activated, the region may mechanically cloak haptic effects generated by the haptic actuator 129.

Figure 2:
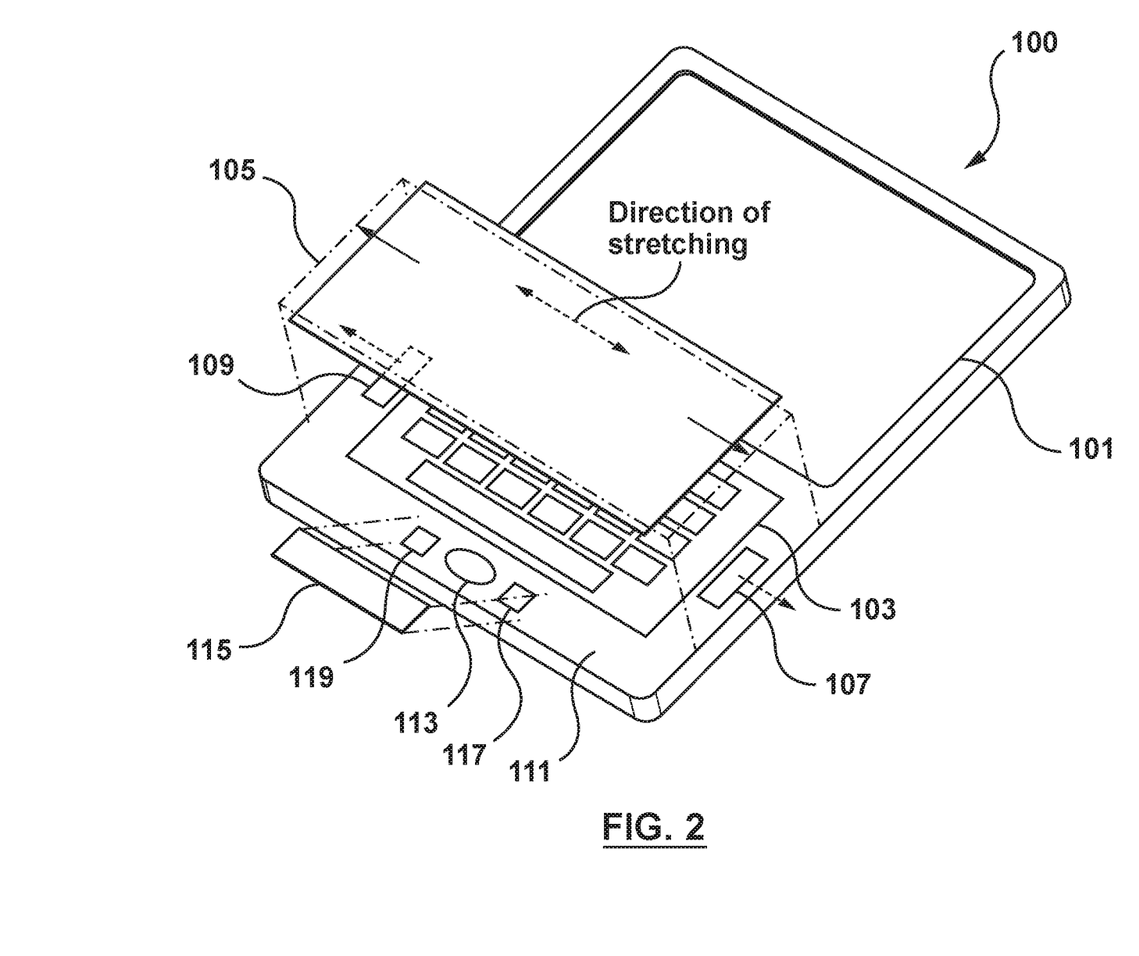
FIG. 2 is a perspective view of a user interface device having a plurality of mechanical metamaterial regions, according to an embodiment herein.
Figure 3:
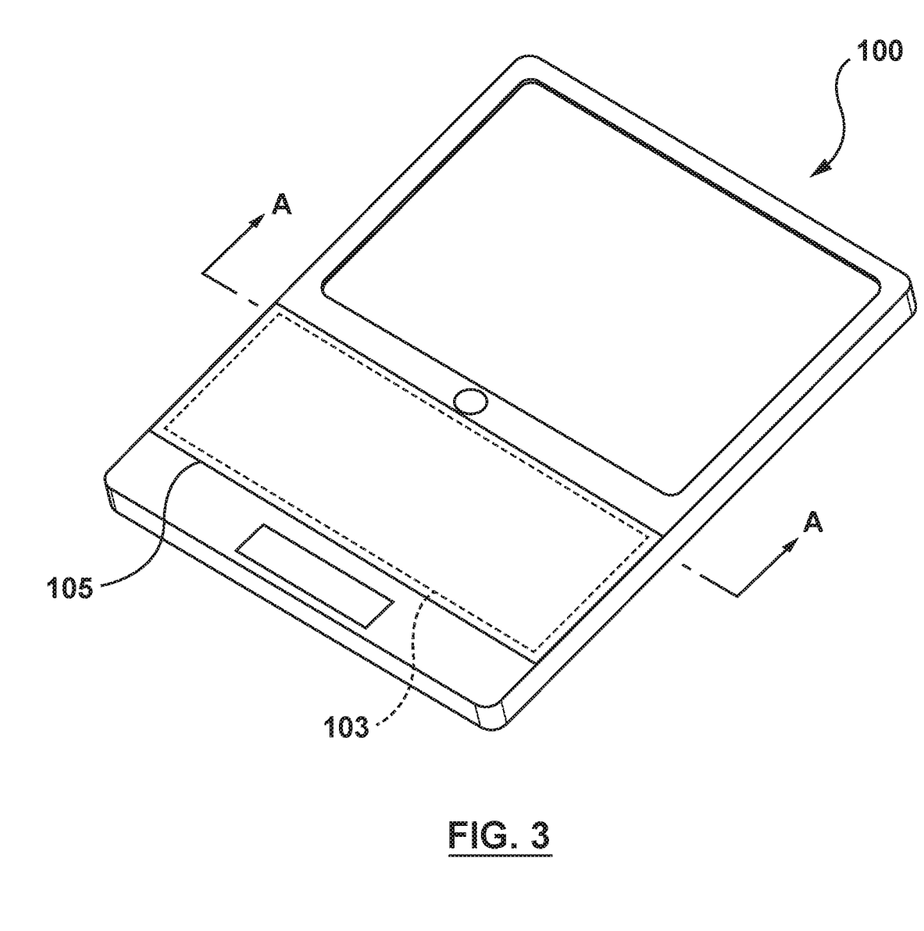
FIG. 3 is a perspective view of a user interface device having a user input component and a mechanical metamaterial region covering the user interface component.

FIG. 2 shows the actuators 107 and 109 of the user interface device 100 being activated to expand along a length of the mechanical metamaterial region 105 and stretch the mechanical metamaterial region 105, which may place the region 105 in an activated state or, alternatively, in a deactivated state. For example, actuators 107 and 109 may each be a stack piezoelectric actuator configured to stretch the mechanical metamaterial region by expanding in a direction shown by the arrows in FIG. 2. As shown in FIG. 2, the actuators 107, 109 may be configured to stretch the mechanical metamaterial region 105 from the dimensions shown in FIG. 1A to the dimensions shown by the dashed outline in FIG. 2. This stretching action may alter the internal structure of the mechanical metamaterial of region 105 to that of an activated state or to that of a deactivated state. FIG. 3 illustrates the first user input component 103 being covered by the mechanical metamaterial region 105.

Figure 3A:
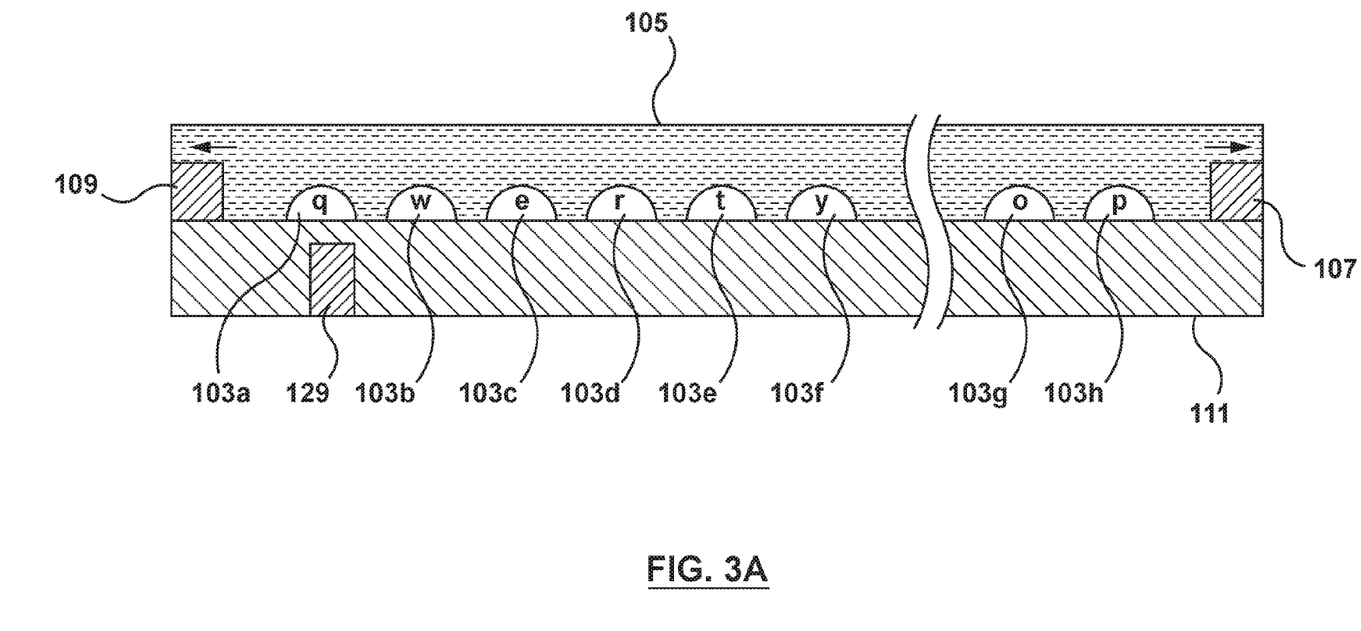
FIG. 3A is a sectional view of the user interface device, according to an embodiment herein.

FIG. 3A depicts a sectional view of the interface device 100 along the line A-A of FIG. 3. The sectional view shows individual buttons 103a-103h (also referred to as keys 103a-103h) of a user input component 103, such as individual buttons of a keyboard. In an embodiment, each button of buttons 103a-103h may have a curved profile, as shown in FIG. 3A.

For example, each button may have the shape of a cylinder or half-sphere. Such buttons may be covered by, e.g., a metamaterial region 105 that is made of a pentamode metamaterial having a lattice of face-centered cubic (fcc) cells. The buttons 103a-103h may be covered by the mechanical metamaterial region 105 by being underneath a top surface of the mechanical metamaterial region 105. In some cases, the buttons 103a-103h may be partially or completely encapsulated by the mechanical metamaterial of region 105. In another embodiment, each button of the user input component 103 may have a substantially rectangular shape. The buttons 103a-103h may be disposed on a substrate layer 111, such as a plastic or metal base.

In an embodiment, the mechanical metamaterial region 105 may be a layer of pentamode material that partially encompasses each of the keys 103a-103h, as shown in FIG. 3A. The pentamode material may be activated by actuators 107, 109. FIG. 3A shows an example in which actuators 107 and 109 actuate by contracting. For instance, the actuators 107, 109 may be piezoelectric actuators that contract to stretch the mechanical metamaterial region in the directions shown in FIG. 3A. That is, the contraction may pull on the sides of the mechanical metamaterial region 105 and stretch the region 105. The stretching may, e.g., change the internal structure of the pentamode material to an activated configuration in which the pentamode material is able to divert strain or stress around an object, such as a user input component encompassed by the pentamode material. In this activated configuration, the pentamode material may thus hide the object from tactile perception. In a more specific example, when a user's finger or stylus presses or otherwise contacts the mechanical metamaterial region 105, stress or strain may be exerted on the layer of pentamode material which forms the region 105. The internal structure of the pentamode material may, however, be configured to divert the stress, strain, or other mechanical effect around a button (e.g., button 103a) directly under the point of contact. The stress, strain, or other mechanical effect may be diverted to the substrate layer 111. Thus, the user may feel like he or she is pressing on the substrate layer 111, rather than on any keyboard button. Accordingly, the layer of pentamode material may hide the keyboard from the user's tactile perception.

In an embodiment, the mechanical meta-material region 105 may comprise a holey sheet that covers the keys 103a-103h of the user input component 103. To cover the keys 103a-103h, the holey sheet may also partially encompass each of the keys 103a-103h, or may be located completely on top of the keys 103a-103h. When the holey sheet is in a deactivated state, it may have a first level of compressibility that allows a user to feel the keys 103a-103h being covered by the holey sheet. When the holey sheet is in an activated state, it may have a second level of compressibility that is lower than the first level. In other words, the holey sheet may exhibit greater rigidity in the activated state than in the deactivated state. With this second, lower level of compressibility, the holey sheet may be sufficiently rigid such that the user is unable to feel the keys 103a-103h under the holey sheet. Thus, the holey sheet may also be used to hide the user input component 103 from a user's tactile perception.

FIG. 3A further illustrates a haptic actuator 129 embedded within the user interface device 100. For instance, the haptic actuator 129 may be a body LRA configured to generate vibrotactile haptic effects. In an embodiment, such vibrotactile haptic effects may be hidden by the mechanical metamaterial region 105 when the region 105 is activated.

Figure 4:
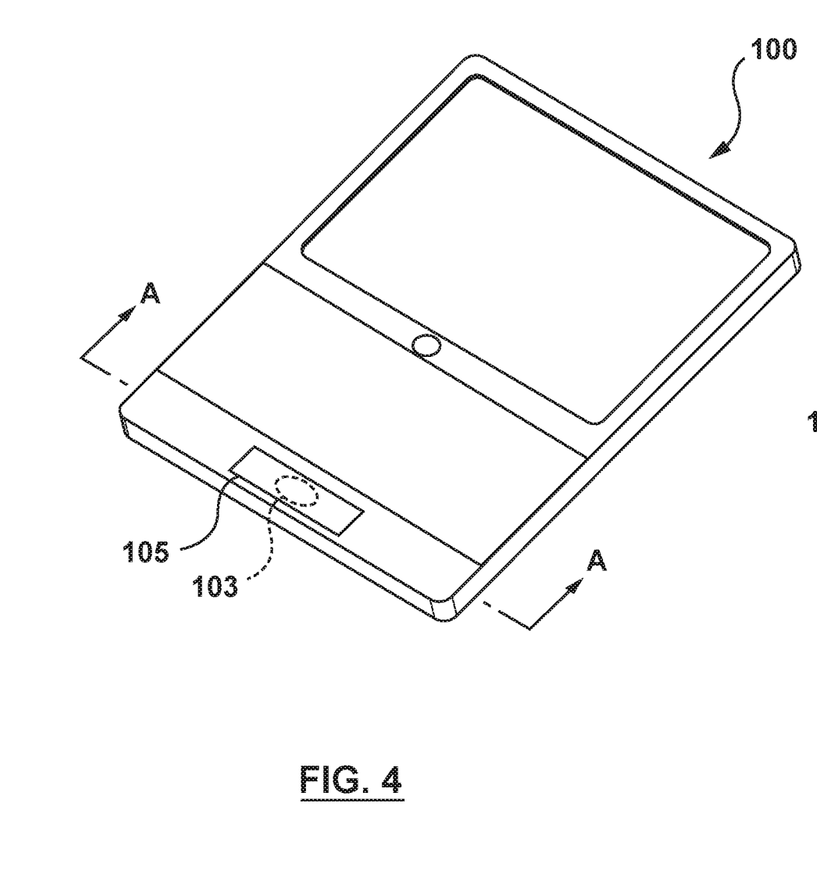
FIG. 4 is a perspective view of a user interface device having a user input component and a mechanical metamaterial region covering the user interface component.
Figure 4A:
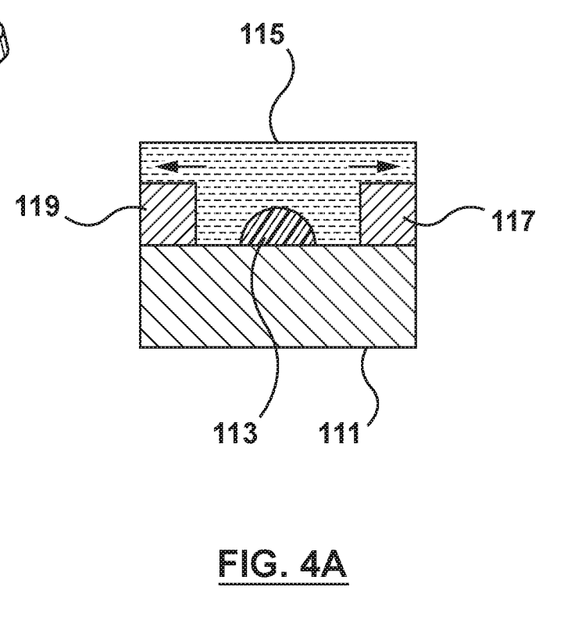
FIG. 4A is a sectional view of the user interface device, according to an embodiment herein.

FIG. 4A depicts a sectional view of the interface device 100 along the line A-A of FIG. 4. FIG. 4A illustrates another user input component 113, such as a home button, covered by the mechanical metamaterial region 115. In an embodiment, the user input component 113 may have a cylindrical or semi-spherical shape. In an activated state, the mechanical metamaterial region 115 may be configured to hide the home button from tactile perception. The mechanical metamaterial region 115 may be activated, e.g., by actuators 119 and 117. For example, each of the actuators 119, 117 may be a stack piezoelectric actuator which contracts in the directions shown in FIG. 4A. The contraction of the piezoelectric actuators may pull the sides of the mechanical metamaterial region 115, which may stretch the mechanical metamaterial region 115 to a configuration corresponding to an activated state.

In an embodiment, a mechanical metamaterial region may be disposed over a portion, or all, of the display 101. The mechanical metamaterial region may be used to hide a haptic effect provided by a haptic actuator from tactile perception. The haptic effect may be, e.g., a low frequency deformation-based haptic effect, a high frequency deformation-based haptic effect (e.g., a vibrotactile effect), or an electrostatic haptic effect. For instance, the mechanical metamaterial region may be activated to hide a groove, bump, or any other type of deformation-based effect created on a surface of display 101.

In an embodiment, one or more optical metamaterial regions may be applied to a user interface device. Each optical metamaterial region may comprise a layer of optical metamaterial. In an embodiment, the optical metamaterial may have an activated state in which its internal structure is able to guide light around an object embedded in the optical metamaterial. Thus, the optical metamaterial may visually cloak the object when the optical metamaterial is in the activated state. By guiding light around the embedded object, such as from an environment behind the object to the front of the object, the optical metamaterial may be able to display the environment behind the object. If a display screen were located behind the object and behind the optical metamaterial region, the optical metamaterial region may allow the display screen to be seen. The optical metamaterial may further have a deactivated state in which the internal structure no longer performs the visual cloaking functionality. In the deactivated state, the object embedded in the optical metamaterial may be visible again, and a view of the display screen may be blocked by the object.

In one example, the optical metamaterial region may be used with a user interface device which has a physical keyboard (e.g., a mechanical keyboard). The keys of the keyboard may be embedded within the optical metamaterial of the optical metamaterial region. The optical metamaterial region may thus perform visual cloaking for the physical keyboard when the physical keyboard is not being used, and stop the visual cloaking when the physical keyboard is needed. For instance, when a user opens a text messaging, text editing, or word processing application, or performs some other action which indicates a need to use the physical keyboard, the layer of optical metamaterial may be in a deactivated state so that the physical keyboard is visible through the optical metamaterial region. When the user opens a video viewing application or performs some other action which indicates there is no longer a need to use the physical keyboard, the optical metamaterial region may be activated to visually cloak the physical keyboard. In some instances, a layer of optical metamaterial may be activated by stretching or compressing the optical metamaterial of the optical metamaterial region. When the optical metamaterial region is activated, the physical keyboard may become invisible to a user, and any portion of a display screen or other material under the keyboard may become visible. More specifically, in an embodiment, the physical keyboard may be placed on a portion of a display screen of a user interface device. When a control unit of the user interface device determines that the physical keyboard is currently not needed, it may activate the optical metamaterial region to visually cloak the physical keyboard and to make the underlying portion of the display screen visible. Optical Metamaterials are discussed in more detail in "Experimental demonstration of a Multiphysics cloak: manipulating heat flux and electric current simultaneously," by Yungui Ma et al.; "A full parameter unidirectional metamaterial cloak for microwaves," by N. Landy; and "A multi-cloak bifunctional device," by Muhammad Raza, which are incorporated herein in its entirety.

The mechanical metamaterial and the optical metamaterial discussed above may be used in separate, alternative embodiments, or may be combined in some embodiments.

Figure 5:
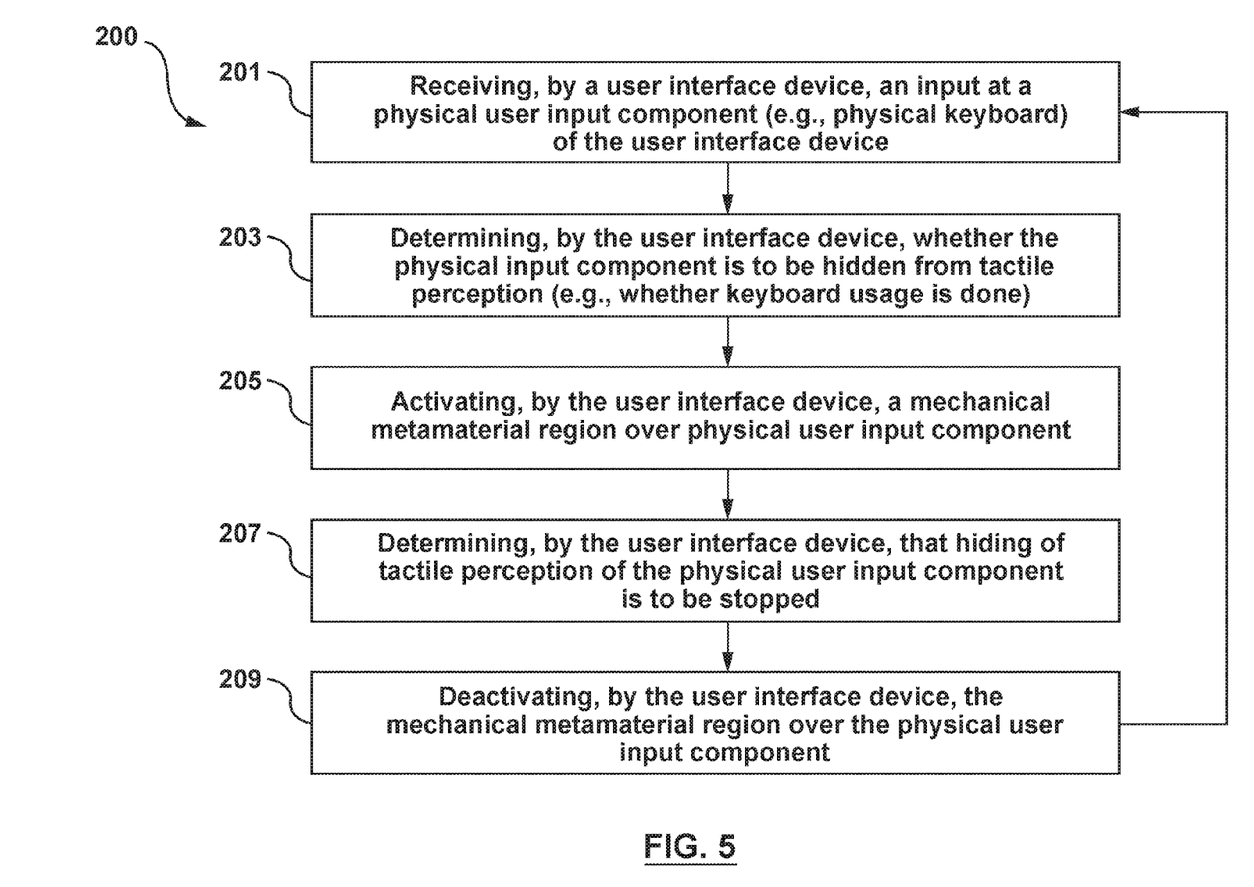
FIG. 5 is a flow diagram of example steps for hiding a user input component from tactile perception, according to an embodiment herein.

FIG. 5 shows a flow diagram which provides an example method 200 for using a metamaterial region, such as mechanical metamaterial region 105. In an embodiment, the method 200 begins at step 201, in which a user interface device receives an input at a physical user input component, such as a physical keyboard, of the user interface device. The input at the physical user input component may indicate, for example, a user interacting with his or her device's user input component, such as a physical keyboard or home button.

In step 203, the user interface device determines whether the physical user input component is to be hidden from tactile perception. For example, a control unit of the user interface device may determine whether keyboard usage is done for an upcoming time period (e.g., for an upcoming 30 seconds). The control unit may make such a determination when, e.g., a user exits a text messaging or word processing application on the user interface device.

In step 205, in response to determining that the physical user input component is to be hidden from tactile perception, the user interface device may activate a mechanical metamaterial region that is disposed over the physical user input component. This step may be performed to activate mechanical cloaking of, e.g., a physical keyboard of the user interface device, so that the user no longer has tactile perception of the keyboard keys.

In step 207, the user interface device may determine that hiding of tactile perception of the physical user input component is to be stopped, or more generally that tactile perception of the physical user input component is to be enabled or is to remain enabled. This determination may occur, for instance, when a user opens a text messaging, text editing, or word processing application, or when an opened application explicitly communicates or requests (e.g., via an application programming interface (API) that provides commands for controlling the activation or deactivation of the mechanical metamaterial regions) that the user interface device be placed in a deactivated state in which the physical input component can be tactilely perceived.

In step 209, in response to the determination that hiding of tactile perception of the physical user input component is to be stopped, the user interface device may deactivate the mechanical metamaterial region that is disposed over the physical user input component. This step may deactivate the mechanical cloaking of the physical user input component.

In an embodiment, method 200 may involve a user interface device that also has an optical metamaterial region disposed over the physical user input component. In such an embodiment, the optical metamaterial region and the mechanical metamaterial region may be activated at the same time and deactivated at the same time. The mechanical metamaterial region may be used to mechanically cloak the user input component, while the optical metamaterial region may be used to visually cloak the user input component.

Figure 6:
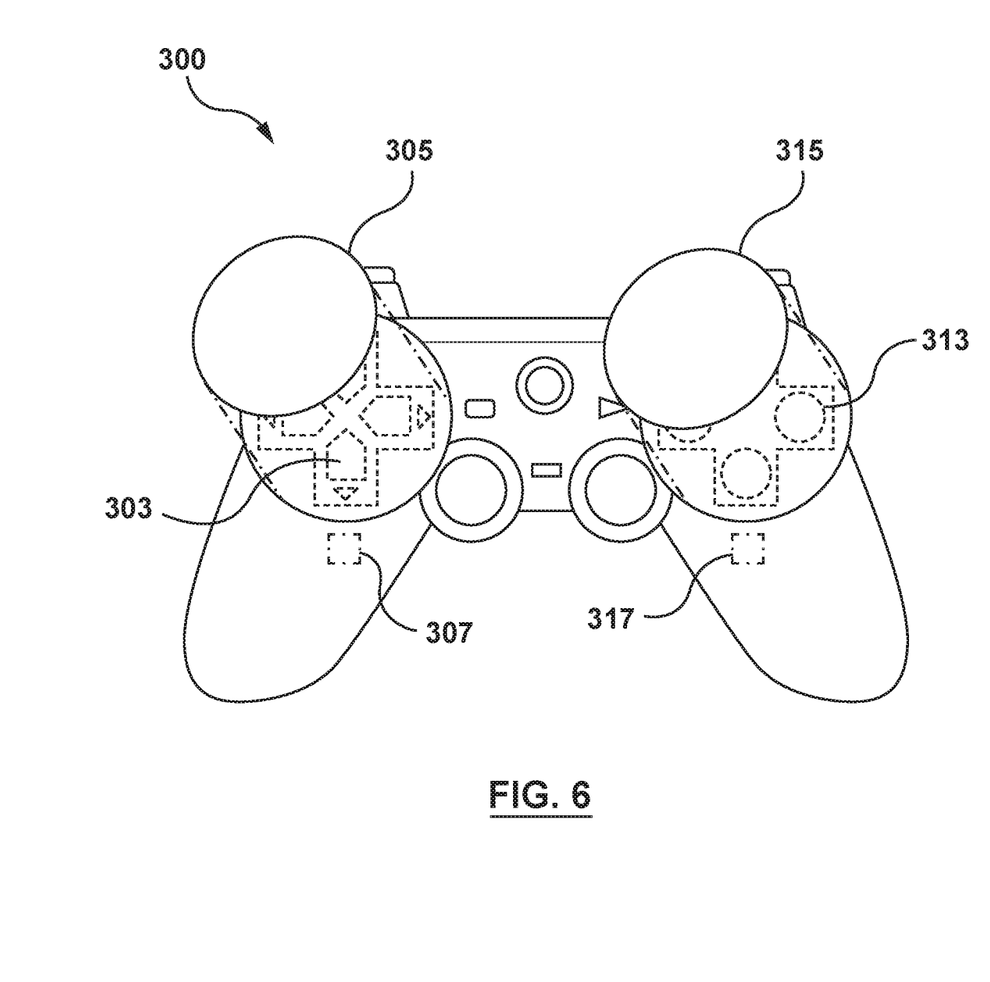
FIG. 6 is a perspective view of a user interface device having a plurality of mechanical metamaterial regions, according to an embodiment herein.

FIG. 6 shows a user interface device 300 that is a game console controller. The game console controller includes multiple metamaterial regions that may hide physical user input components of the game console controller from tactile perception. The game controller includes a first set 303 of user input components (e.g., a set of arrow buttons) and a second set 313 of user input components (e.g., another set of buttons). The buttons may provide input for a game application executing on a host computer in communication with the game console controller. The game controller further includes a first mechanical metamaterial region 305 that covers the first set 303 of user input components, and includes second mechanical metamaterial region 315 that covers the second set 313 of user input components. The mechanical metamaterial region 305 may be activated by the actuator 307 to perform mechanical cloaking of the first set of user input components, while the mechanical metamaterial region 315 may be activated by actuator 317 to perform mechanical cloaking of the second set 313 of user input components. As discussed above, mechanical cloaking may be performed for user input components when they currently have no function in a game at a present time, so that a user is less likely to press or otherwise interact with the user input components. Additionally, the mechanical metamaterial regions may be combined with one or more optical metamaterial regions to visually cloak user input components which have no function at a present time. When a metamaterial region is disposed over a group of buttons, the visual or mechanical cloaking may be activated only when there is a determination that all of the covered buttons or keys have no corresponding functionality in an application presently being executed on the user interface device.

In an embodiment, the mechanical or optical metamaterial region(s) may be used in a gaming application, a wearable application, an augmented reality (AR) or virtual reality (VR) application, another computing application, or any other application.

One skilled in the art will appreciate that although specific examples and embodiments of the system and methods have been described for purposes of illustration, various modifications can be made without deviating from present invention. For example, embodiments of the present invention may be applied to many different types of objects or devices operating individually or in conjunction with other devices. Moreover, features of one embodiment may be incorporated into other embodiments or combined with features of another embodiment, even where those features are not described together in a single embodiment within the present document.

What is claimed is:

1. A user interface device, comprising:
   a user input component;
   a mechanical metamaterial region located over the user input component;
   one or more actuators coupled to the mechanical metamaterial region, wherein the mechanical metamaterial region has an internal structure that is alterable by the one or more actuators, and has a mechanical property that changes in response to the alteration of the internal structure by the one or more actuators; and
   a control unit in communication with the one or more actuators, and configured
      to determine whether the user input component is to be hidden from tactile perception, and
      to activate the one or more actuators coupled to the mechanical metamaterial region located over the user input component to alter the internal structure of the mechanical metamaterial region in response to the determination that the user input component is to be hidden from tactile perception.

2. The user interface device of claim 1, wherein the one or more actuators are configured to stretch or compress the mechanical metamaterial region, wherein the mechanical property of the mechanical metamaterial region changes in response to the mechanical metamaterial region being stretched or compressed.

3. The user interface device of claim 2, wherein the mechanical metamaterial region comprises a rectangular layer of mechanical metamaterial, and wherein the one or more actuators are configured to stretch or compress the mechanical metamaterial region along a length or width of the rectangular layer of mechanical metamaterial.

4. The user interface device of claim 2, wherein the control unit is further configured to determine whether a haptic effect on the user interface device is to be hidden from tactile perception, and to activate the one or more actuators in response to determining that the haptic effect is to be hidden on the user interface device.

5. The user interface device of claim 2, wherein the determination of whether the user input component is to be hidden from tactile perception is based on an identity of an application that is running on the user interface device.

6. The user interface device of claim 5, wherein the user input component is a keyboard, and wherein the control unit is configured to determine that tactile perception of the user input component is to be enabled or to remain enabled in response to a determination that the application running on the user interface device is a text messaging application or a text editing application.

7. The user interface device of claim 6, wherein the control unit is configured to determine that the user input component is to be hidden from tactile perception in response to a determination that the application running on the user interface device is a video viewing application.

8. The user interface device of claim 1, wherein the mechanical metamaterial region is at least first and second mechanical metamaterial regions that are isolated from each other, so that a mechanical property of the first mechanical metamaterial region can be changed without changing a mechanical property of the second mechanical metamaterial region.

9. The user interface device of claim 8, wherein the user input component is a button and is one of a plurality of buttons on the user interface device, and wherein each of the first and second mechanical metamaterial regions covers a different button of the plurality of buttons.

10. The user interface device of claim 9, wherein the control unit is configured to cause an internal structure of one of the at least first and second mechanical metamaterial regions to change in response to determining that all buttons covered by the one of the at least first and second mechanical metamaterial regions currently has no functionality in an application being executed on the user interface device.

11. The user interface device of claim 1, wherein the user input component is a physical user input component.

12. The user interface device of claim 11, wherein the user interface device does not include a pump layer or a fluid layer.

13. The user interface device of claim 1, wherein the internal structure of the mechanical metamaterial region has a lattice structure that can be altered by the one or more actuators.

14. The user interface device of claim 1, wherein the internal structure of the mechanical metamaterial region has an array of holes, wherein a respective hole of the array of holes has a diameter in a range between 7 mm and 10 mm and has a shape that can be altered by the one or more actuators.

15. The user interface device of claim 1, wherein the mechanical property that changes in response to the alteration of the internal structure is at least one of a shear modulus and a bulk modulus of the mechanical metamaterial region.

16. The user interface device of claim 15, wherein the mechanical metamaterial region is made of a pentamode metamaterial.

17. The user interface device of claim 1, wherein the user interface device is a mobile phone, wherein the user interface device further comprises a display device, and the user input component is a keyboard adjacent to the display device.

18. The user interface device of claim 1, wherein the user interface device is a game console controller in communication with a host computer, and the user input component is a button.

19. A user interface device, comprising:
   a component having a first surface;
   a mechanical metamaterial region located over the first surface;
   an activation device coupled to the mechanical metamaterial region, wherein the mechanical metamaterial region has an internal structure that is alterable by the activation device, and has a mechanical property that changes in response to the alteration of the internal structure by the activation device;
   a control unit in communication with the activation device, and configured
      to determine whether the component having the first surface is to be hidden from tactile perception, and
      to cause the activation device to alter the internal structure of the mechanical metamaterial region located over the first surface in response to the determination that the component having the first surface is to be hidden from tactile perception.

20. The user interface device of claim 19, wherein the component is a user input component, and the activation device comprises one or more actuators.

21. The user interface device of claim 1, wherein the user input component is a permanent user input component.

22. The user interface device of claim 21, wherein the permanent user input component is a permanent keyboard.

23. The user interface device of claim 21, wherein the control unit is configured to activate the one or more actuators coupled to the mechanical metamaterial region further in response to a determination that the user input component presently has no function in an application being executed on the user interface device.

24. The user interface device of claim 23, wherein the user interface device is a game console controller.

* * * * *